United States Patent [19]
Graber et al.

[11] Patent Number: 5,812,769
[45] Date of Patent: *Sep. 22, 1998

[54] METHOD AND APPARATUS FOR REDIRECTING A USER TO A NEW LOCATION ON THE WORLD WIDE WEB USING RELATIVE UNIVERSAL RESOURCE LOCATORS

[75] Inventors: Terry E. Graber, Downingtown; Joshua Kopelman, Malvern; Edwin Howell Watkeys, III, North Wales; Marvin I. Weinberger, Havertown, all of Pa.

[73] Assignee: Infonautics Corporation, Wayne, Pa.

[*] Notice: The term of this patent shall not extend beyond the expiration date of Pat. No. 5,712,979.

[21] Appl. No.: 531,371

[22] Filed: Sep. 20, 1995

[51] Int. Cl.⁶ .......................... G06F 13/14; G06F 13/42; H04L 12/46; H04L 29/02

[52] U.S. Cl. .............................. 395/200.12; 395/200.09; 395/200.16; 395/214; 395/762

[58] Field of Search ........................ 395/200.06, 200.09, 395/200.11, 200.12, 200.15, 200.16, 214, 240, 244, 187.01, 741, 762, 615, 774; 340/825.34, 825.53; 380/23, 24, 25, 49; 379/118, 127, 142; 364/225.1, 225.4, 227.3, 286.5, 918.1, 918.9, DIG. 1, DIG. 2

[56] References Cited

U.S. PATENT DOCUMENTS

| | | |
|---|---|---|
| 4,726,014 | 2/1988 | Goldman et al. . |
| 4,885,789 | 12/1989 | Burger et al. . |
| 5,095,480 | 3/1992 | Fenner . |
| 5,159,669 | 10/1992 | Trigg . |
| 5,210,820 | 5/1993 | Kenyon . |
| 5,220,655 | 6/1993 | Tsutsui ............................... 395/200.11 |
| 5,355,472 | 10/1994 | Lewis . |
| 5,359,508 | 10/1994 | Rossides . |
| 5,416,842 | 5/1995 | Aziz . |

(List continued on next page.)

FOREIGN PATENT DOCUMENTS

| | | |
|---|---|---|
| 648113 | 11/1992 | Australia . |
| 4213393 | 10/1993 | Australia . |

OTHER PUBLICATIONS

Product Description; "Doctor HTML . . . No more bugs on your web site, Commission Program"; retrieved from internet http://www.smartbiz.com/doctor.htm, Mar. 13, 1997.

Agreement Form; "Doctor HTML Commission Program, Sign–Up Form & Agreement"; retrieved from internet http://drhtml.imagiware.com/sbss/agreement.html, Mar. 13, 1997.

Promotional Description; "Start Making Some Serious Bucks On The Internet"; retrieved from internet http://www.mymall.net/advertising/BannerBounty.htm, Jul. 28, 1997.

(List continued on next page.)

*Primary Examiner*—Eric Coleman
*Assistant Examiner*—Mark H. Rinehart
*Attorney, Agent, or Firm*—Reed Smith Shaw & McClay LLP

[57] ABSTRACT

A method and apparatus for redirecting a user from a first location on the WWW to a second location on the WWW, wherein relative URL addressing is used during the redirecting process. A signal is received from the first location indicating that the user wishes to move from the first location on the WWW to the second location on said WWW. In response to the signal, a current URL representing an address of the first location on the WWW and a destination URL portion representative of an address of the second location on the WWW are passed to a redirecting means. The current URL includes first and second portions. A destination URL is formed with redirecting means by substituting the destination URL portion in place of the second portion in the current URL, wherein the destination URL represents a relative address of the second location on the WWW. The user is then moved from the first location on the WWW to the second location on the WWW in accordance with the destination URL formed by the redirecting means.

12 Claims, 7 Drawing Sheets

5,812,769
Page 2

U.S. PATENT DOCUMENTS

| | | |
|---|---|---|
| 5,442,342 | 8/1995 | Kung . |
| 5,491,820 | 2/1996 | Belove et al. . |
| 5,499,297 | 3/1996 | Boebert . |
| 5,530,952 | 6/1996 | Meske, Jr. et al. ............... 395/200.09 |
| 5,537,314 | 7/1996 | Kanter ..................................... 395/214 |
| 5,537,546 | 7/1996 | Sauter ..................................... 395/762 |
| 5,537,586 | 7/1996 | Amram et al. . |
| 5,544,322 | 8/1996 | Cheng et al. . |
| 5,557,721 | 9/1996 | Fite et al. . |
| 5,561,706 | 10/1996 | Fenner . |
| 5,572,643 | 11/1996 | Judson . |
| 5,590,180 | 12/1996 | Tonomura et al. . |
| 5,603,025 | 2/1997 | Tabb . |

OTHER PUBLICATIONS

Que Corporation, Using the World Wide Web, ISBN 0–7897–0016–6, USA, pp. 59–109, 1994.

Press Release, "Streams Readies Release of Breakthrough Internet Media Planning and Assessment", Chicago, USA, retrieved from internet http://streams.com/press_release-.html, pp. 1–2, Aug. 31, 1995.

W3 Organization, "HTTP Request fields", retrieved from internet http://www.w3.org/pub/WWW/Protocols/HTTP/HTRQ_Headers.html, pp. 1–5, May 3, 1994.

Heylighen F., "World–Wide Web: a distributed hypermedia paradigm for global networking", Proceedings. SHARE Europe Spring Conference, pp. 355–368, Apr. 18, 1994.

Brody H, "<Internet@crossroads.$$$>", Technology Review, vol. 98 Iss. 4, pp. 24–31, May 1995.

Moore, Steve "Internet Security Split: Let the Browser Beware," Abstract, Computerworld, v29, N35, P59(2), Aug. 28, 1995.

Wimer, W. "Clarifications and Extensions for the Bootstrap Protocol," RFC1532 pp. 1–19, Oct. 1993.

Bader, Rich "Electronic Publishing with Mosaic," PC Letter, v10, N14, P4(1), Aug. 15, 1994.

"Biznet Technologies Announces Release of Versatile Virtual Vending," PR Newswire, p0913DC028, Oct. 1994.

"An Exclusive EMR Series–Part Three Strategies Diverge Among Web Service Providers," Electronic Marketplace Report, v9, n14, p6(1), Jul. 18, 1995.

Frook, John Evan "Web vs. Other Media Outlets," Interactive Age, n216, p5, Jun. 5, 1995.

Ury, Jill "Delahaye Group to Offer NetBench," Business Wire, s1, p1, May 31, 1995.

Foster, Marilyn S. "Hardccopy to Online Publications—It Can Be Done," IEEE, pp. 51–57, 1990.

"HotWired Gets Star from Nielsen," Advertising Age, v66, n25, p18, Jun. 19, 1995.

Little, Thomas "Commerce on the Internet," IEEE Multimedia, v1, n4, pp. 74–78, 1994.

"Research Firms Strive for Web Tracking That Counts," Interactive Marketing News, v2, n13, Jun. 23, 1995.

Krantz, Michael "Keeping an Eye on I/Pro," Mediaweek, v5, n15, p. 12, Apr. 10, 1995.

Lau, Teresa "Building a Hypermedia Information System on the Internet," Professional Communication Conference, 1994, pp. 192–196.

Resnick, Rosalind "Tread Lightly on the Internet," Home Office Computing, v12, n4, p80(2), Apr. 1994.

Rothschild, Michael "Stagecoach Days on the Infohighway," Forbes, v153, n5, pS25(2), Feb. 28, 1994.

LaPlante, Alice "Does Your Corporate Data Have Value?" InfoWorld, v15, n43, p60(1), Oct. 1993.

METHOD AND APPARATUS FOR REDIRECTING A USER TO A NEW LOCATION ON THE WORLD WIDE WEB USING RELATIVE UNIVERSAL RESOURCE LOCATORS

FIELD OF THE INVENTION

The present invention is directed to on-line computer systems for delivering information and computer services to users coupled to such systems. More particularly, the present invention is directed to an automated system for capturing information representing the identity of an entity that has directed a user to an on-line system. Still more particularly, the present invention is directed to a system for tracking user paths on the world wide web (WWW).

BACKGROUND OF THE INVENTION

On-line computer services such as, for example, on-line information retrieval services, on-line travel reservation services, or on-line stock trading services, receive new subscribers from various sources. New subscribers are typically directed to an on-line service by advertisements placed by the on-line service itself through word-of-mouth referrals given by existing system subscribers, or by third party computer system marketers (referred to hereinafter as co-marketers) of the on-line service. Different co-marketers may typically use different media for promoting a particular on-line computer service. For example, a magazine acting as a co-marketer for an on-line service might use a magazine advertisement, which includes a free software disk for accessing the on-line service, to promote the on-line service. Alternatively, various directory services available on the WWW such as, for example, the Yaho® or Web Crawler® directory services, might use a listing on their directory pages and a link to a WWW page associated with an on-line service, to direct potential new subscribers to an on-line service. Thus, new subscribers can be directed to the same on-line service from different co-marketers and through different marketing channels. It would be desirable to be able to capture and track the co-marketing source which directed each new subscriber to an on-line service. In addition, it would be desirable to capture and track the co-marketing source which directed a new subscriber to an on-line service in a manner which required no participation or intervention from the new subscriber.

When a user navigates through various sites during a session on the WWW, the navigational history reflecting the past locations traversed by the user during the session is typically lost as the user moves from one site to the next site. Thus, unless the user were to manually track the various sites traversed during a world wide web session, it would be difficult for the user, or for any service monitoring the user, to know the identity of any previous world wide web site traversed by the user during a session. It would be desirable to have a system for attaching navigational history information to a user traversing the WWW so that a current web site could determine electronically at least the previous WWW site visited by the user.

Universal resource locators are often used to direct users through various pages at a site on the world wide web. There are two different techniques for specifying addresses using universal resource locators. In a first technique, known as fully specified addressing, the full string associated with a universal resource locator is specified each time a user moves from one web page to the next web page. In the second technique, known as relative addressing, only information representing the root directory or the current directory (or subdirectory) of the user is specified as a user moves from one web page to the next web page. One drawback of using relative universal resource locator addressing is that it is impossible to move "up a directory tree" using such addressing, without specifying the root directory. UNIX symbolic links may be used in specifying a particular root directory. However, when relative addressing is used, it is impossible to carry this UNIX symbolic link information forward as a user moves from page to page. It would be desirable if this limitation of relative universal resource locator addressing could be ameliorated, such that the UNIX symbolic link information could be retained during the relative addressing of web pages.

It is therefore an object of the present invention to provide a unified system for capturing and tracking a co-marketing source which directed a new subscriber to an on-line service.

It is a further object of the present invention to provide a system for capturing and tracking information identifying a co-marketing source which directed a new subscriber to an on-line service, which requires no participation or intervention from the new subscriber.

It is a still further object of the present invention to provide a system for attaching navigational history information to a user traversing the world wide web so that a current web site could determine electronically at least the previous world wide web site visited by the user.

It is a still further object of the present invention to provide a system which could be used in conjunction with relative universal resource locator addressing, which permitted a user in a particular directory at a web site to move up a directory tree.

These and other objects of the invention will become apparent from the description of the invention which follows.

SUMMARY OF THE INVENTION

The present invention is directed to an apparatus for capturing and storing a co-marketer identification symbol representing an identity of an entity that has referred a user on a user station to a computer service, wherein the user station is coupled to the computer service by a communications path. A database is provided for storing a plurality of user records. Each of the user records includes a user identification field for storing information uniquely associating each of the user records with a user, and a co-marketer identification field for storing identity information representing the identity of an entity that directed the user to the computer service. An enrollment means is coupled to the communications path and the database, and is provided for enrolling a user on the computer service. The enrollment means includes means for determining a co-marketer that directed the user to the computer service, and means for assigning a unique user identification number to the user. The enrollment means further includes means for storing a co-marketer identification symbol representative of a co-marketer and the unique user identification number of a user in the co-marketer identification and user identification fields, respectively, of one of the user records.

In accordance with a further aspect, the present invention is directed to a method and apparatus for tracking the navigation path of a user that has been directed to a second site on the WWW from a first site on the WWW. The first site has a universal resource locator (URL) symbol for uniquely identifying an address of the first site on the WWW, and the second site has a URL symbol for uniquely identifying an address of the second site on the WWW. A composite URL symbol is received at the second WWW site when the user is directed from the first site to the second site. The composite URL symbol has a first portion corresponding to the URL symbol of the second site, and a second portion that includes information corresponding to the identity of the first site. The information representative of the identity of the first site is captured at the second WWW site from the second portion of the composite URL. The identity of the first WWW site is then determined at the second WWW site by comparing information from the second portion of the composite URL to a table having a plurality of entries each of which is representative of a known WWW site.

In accordance with a still further aspect, the present invention is directed to a method and apparatus for redirecting a user from a first location on the WWW to a second location on the WWW, wherein relative URL addressing is used during the redirecting process. A signal is received from the first location indicating that the user wishes to move from the first location on the WWW to the second location on said WWW. In response to the signal, a current URL representing an address of the first location on the WWW and a destination URL portion representative of an address of the second location on the WWW are passed to a redirecting means. The current URL includes first and second portions. A destination URL is formed with redirecting means by substituting the destination URL portion in place of the second portion in the current URL, wherein the destination URL represents a relative address of the second location on the WWW. The user is then moved from the first location on the WWW to the second location on the WWW in accordance with the destination URL formed by the redirecting means.

In accordance with a still further aspect, the present invention is directed to a method and apparatus for tracking the navigation path of a user that has been directed to a second site on the WWW from a first site on the WWW. A URL is received at the second WWW site when the user is directed from the first site to the second site. At the second WWW site, information representative of an identity of the first WWW site is captured by identifying a first code in the URL. A destination web page is determined for the user, and a revised destination web page is formed by inserting a second code representative of the identity of the first WWW site into at least one selected web page link associated with the destination web page. The revised destination web page is then transmitted to the user.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DETAILED DESCRIPTION OF THE INVENTION

Figure 1:
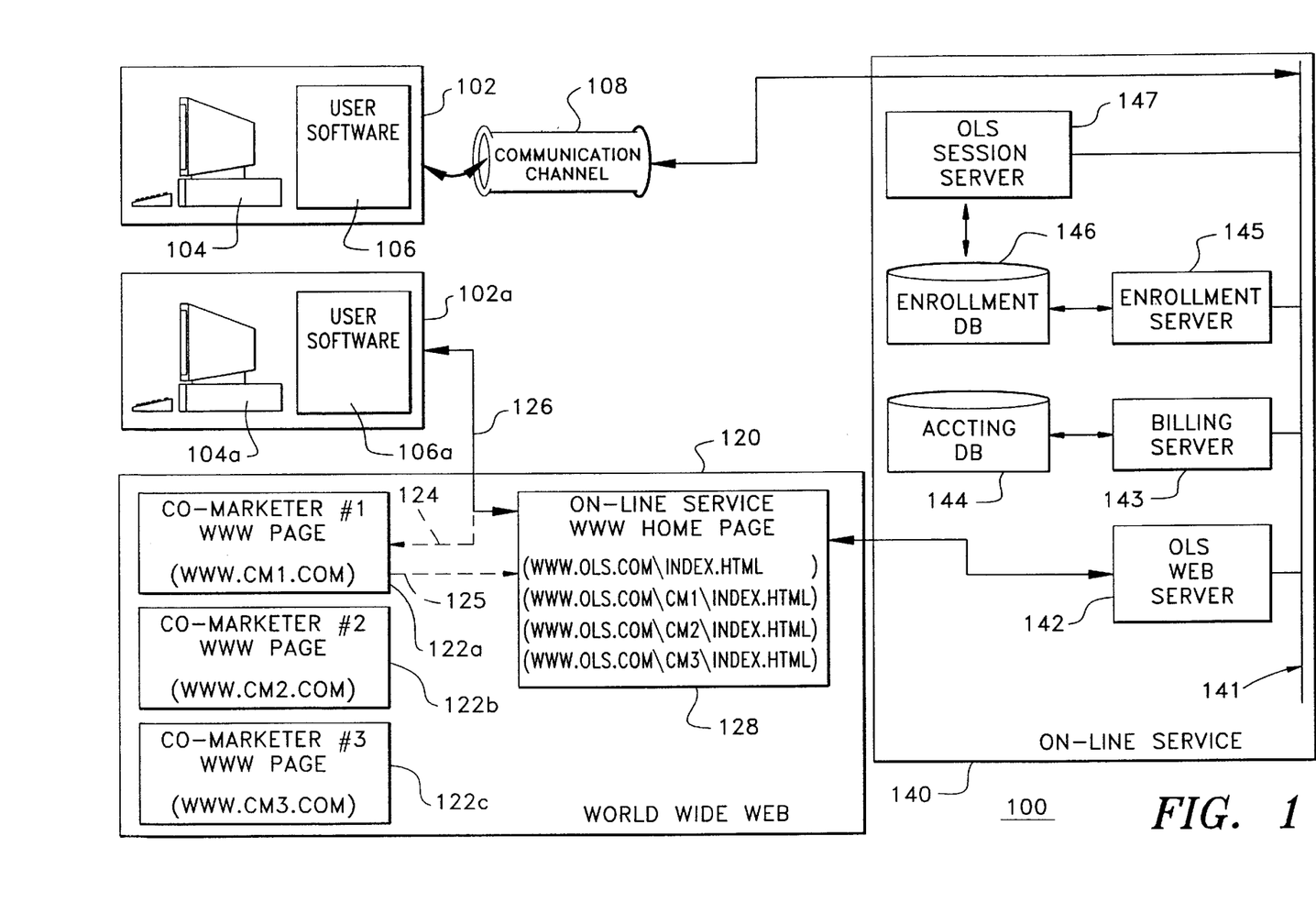
FIG. 1 is a block diagram showing a system for enrolling new users on an on-line system and capturing co-marketing information associated with such new users, in accordance with a preferred embodiment of the present invention.

Referring now to FIG. 1, there is shown a block diagram of a system 100 for enrolling new users on an on-line system and capturing co-marketing information associated with such new users, in accordance with a preferred embodiment of the present invention. System 100 includes a first type of user station 102. The user station 102 includes a personal computer (PC) 104 and user software 106 which resides on PC 104. User software 106 includes a graphical user interface (not shown) for facilitating communications between user station 102 and On-Line Service (OLS) 140. OLS 140 represents a computer service such as, for example, an information retrieval service, a travel reservation service, or a stock trading service, which is available on-line to a user of user station 102. User station 102 is coupled to a Fiber Distributed Data Interface (FDDI) 141 in OLS 140 by a communications channel 108. In alternate embodiments, a standard communications bus or a local area network may be substituted for FDDI 141. Communications channel 108 may consist of a communications link formed over a public network such as the Internet. Alternatively, communications channel 108 may consist of a communications link formed between PC 104 and FDDI 141 over a commercial network. Thus, commercial networks such as, for example, the Prodigy® network, the CompuServe® network, or the Microsoft® network, may be used to establish a communications channel 108 for linking PC 104 and FDDI 141. Although in the preferred embodiment of the present invention, element 140 is shown as being an on-line computer service, it will be understood by those skilled in the art that element 140 may alternatively represent any computer service, regardless of whether the service is available on-line.

As explained more fully below, user software 106 is preferably provided to a user of user station 102 by an on-line service co-marketer (CM) and loaded onto PC 104 prior to the time the user of user station 102 attempts to enroll on OLS 140. User software is preferably provided to the user of user station 102 from the CM via a floppy disk, CD-ROM disk magnetic tape or through a File Transfer Protocol (FTP) site on the Internet. User software 106 preferably includes an embedded co-marketer symbol or code which can be recognized by OLS 140 whenever the user of user station 102 connects to OLS 140. The co-marketer symbol embedded in the user software uniquely represents the identity of the co-marketer that provided user software 106 to the user of user station 102. An example of a co-marketer that might provide user software 106 to a user of user station 102 might include, for example, a magazine publisher that advertises OLS 140 in its magazine and includes a floppy disk with user software 106 together with the magazine advertisement.

System 100 also includes a second type of user station 102a. The user station 102a includes a PC 104a and user software 106a which resides on PC 104a. Like user software 106, user software 106a includes a graphical user interface (not shown) for facilitating communications between user station 102a and On-Line Service (OLS) 140. However, unlike user station 102, user station 102a is coupled to OLS 140 through the WWW 120. More particularly, user station 102a is coupled to an OLS web server 142 at OLS 140 through the WWW site 128 associated with OLS 140 on the WWW 120.

The navigation history of the user of user station 102a on WWW 120 is shown generally by dotted lines 124, 125 and solid line 126. As shown by dotted line 124, user station 102a was initially coupled to site 122a of a first co-marketer on WWW 120. In the preferred embodiment of the present invention, a page at site 122a includes an advertisement (not shown) for OLS 140. In addition, the advertisement at co-marketer site 122a is preferably such that a user of user station 102a may chose to connect to OLS site 128 simply by "clicking" on the advertisement at WWW site 122a. As explained more fully below in connection with FIG. 5, when the user of user station 102a clicks on the advertisement for OLS 140 at WWW site 122a, WWW site 122a forms a special destination URL having two parts. The first part of the destination URL is formed of the URL associated with OLS site 128 (e.g., WWW.OLS.COMM). The second part of the destination URL is formed of a destination filename (e.g., INDEX.HTML) and a UNIX symbolic link (e.g., \CM1) that is prepended to the beginning of the destination filename by the co-marketer (co-marketer #1) associated with WWW site 122a. The symbol or code used to form the UNIX symbolic link (e.g., \CM1) inserted by co-marketer #1 at site 122a is uniquely associated with co-marketer #1 in system 100. The complete destination URL is used to route the user (along dotted line 125) from WWW site 122a of co-marketer #1 to OLS WWW site 128. Upon reaching OLS site 128, the user station 102a is coupled to OLS WWW site 128 by solid line 126, and the complete destination URL formed at site 122a (including the UNIX symbolic link portion of such destination URL) is passed to OLS 140 through OLS web server 142.

In addition to the co-marketer represented by site 122a (co-marketer #1), users may be directed to OLS site 128 on WWW 120 through advertisements (not shown) on pages at the sites of other co-marketers represented on the WWW 120 such as, for example, through an advertisement at WWW site 122b (representing co-marketer #2), or an advertisement at WWW site 122c (representing co-marketer #3). Like the situation described above wherein a user of user station 102a clicks on the advertisement for OLS 140 at WWW site 122a, when the user of user station 102a clicks on the advertisement for OLS 140 at WWW site 122b or 122c, WWW site 122b forms a special destination URL having two parts. The first part of the destination URL is again formed of the URL associated with OLS site 128 (e.g., WWW.OLS.COMM), and the second part of the destination URL is again formed of a UNIX symbolic link that is prepended to a destination filename. However, if the user has clicked on an advertisement for OLS 140 at site 122b, the UNIX symbolic link (e.g., \CM2) inserted by the co-marketer (co-marketer #2) will be uniquely associated in system 100 with co-marketer #2 and site 122b. Similarly, if the user has clicked on an advertisement for OLS 140 at site 122c, the UNIX symbolic link (e.g., \CM3) inserted by the co-marketer (co-marketer #3) will be uniquely associated in system 100 with co-marketer #3 and site 122c. A complete destination URL formed at either site 122b or 122c may be used as described above in connection with site 122a to route the user from site 122b or 122c to OLS WWW site 128. Although only three co-marketers are shown in FIG. 1 for directing users from the WWW sites of such co-marketers to OLS site 128, it will be understood by those skilled in the art that more than three co-marketing sites may be used in conjunction with the present invention for directing users to OLS site 128 on WWW 120.

In the preferred embodiment of system 100, OLS 140 will accept a user that has been routed to OLS site 128 by a co-marketer only if the co-marketer that has done the routing is an authorized co-marketer for OLS 140. In system 100, a co-marketer will be authorized to route users to site 128 only after the co-marketer has been assigned and has received a unique UNIX symbolic link associated with the co-marketer from OLS 140. First and second Co-Marketer Identification Tables are stored respectively on enrollment database 146 and accounting database 144 at OLS 140. As described more fully below in conjunction with FIG. 4, each Co-Marketer Identification Table includes a separate record for storing a co-marketer identification code associated with each co-marketer (e.g., co-marketer #1, co-marketer #2, co-marketer #3) that has been authorized by OLS 140 to route users to OLS site 128.

Figure 2:
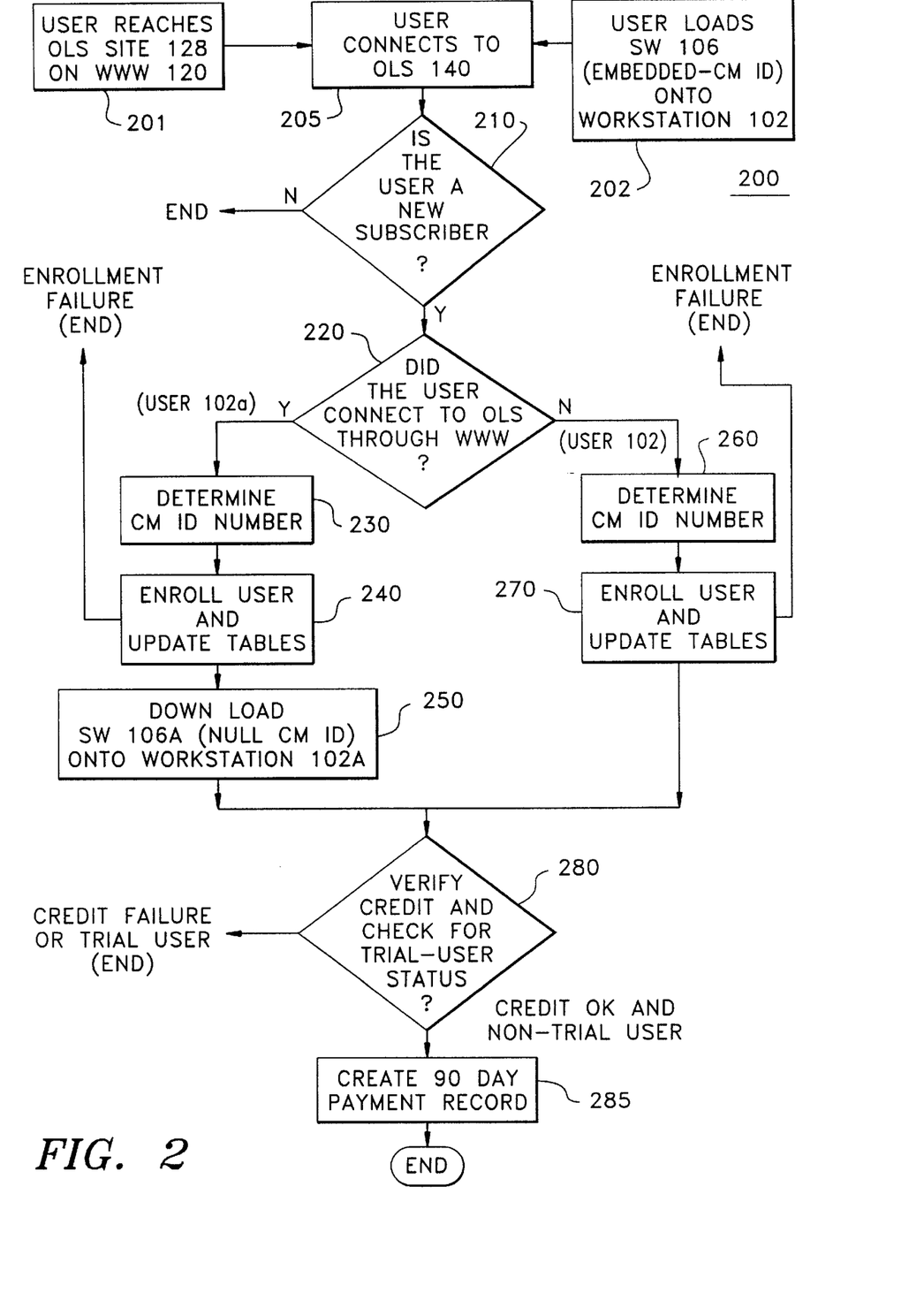
FIG. 2 is a flow diagram illustrating the operation of a system for enrolling new users on an on-line system and capturing co-marketing information associated with such new users, in accordance with a preferred embodiment of the present invention.
Figure 7:
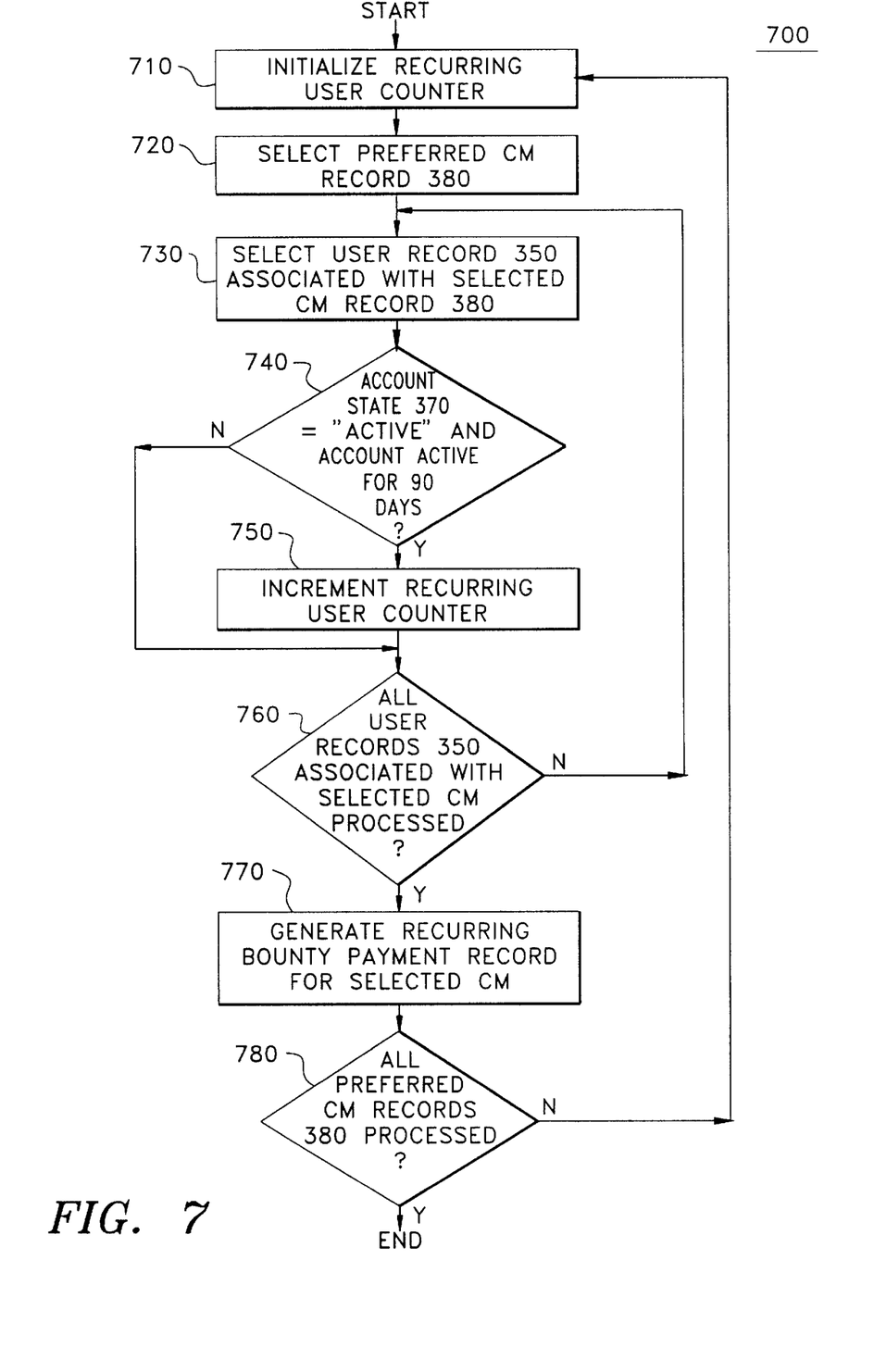
FIG. 7 is a flow diagram illustrating the operation of a system for generating recurring bounty payment records, in accordance with a preferred embodiment of the present invention.

System 100 includes an enrollment server 145 for enrolling new users on OLS 140, and a billing server 143 for generating bounty payment records for issuing bounty payments to authorized co-marketers that have referred users of user stations 102, 102a to OLS 140. For purposes of the present application, the term "server", when used in conjunction with "enrollment" or "billing", is used to refer to a physical machine formed from at least one computer processor having associated memory and software installed thereon for executing the functions to be performed by the server. In the preferred embodiment of the present invention, the hardware platform used for implementing enrollment server 145 consists of a Tandem Model 4412 computer having 2 processors, 200 MB of memory, a 1 GB system disk, and a 4 GB RAID disk; a flow diagram illustrating the operation of a preferred software system 200 for implementing enrollment server 145 on this hardware platform is shown in FIG. 2 and discussed below. In the preferred embodiment of the present invention, the hardware platform used for implementing billing server 143 consists of a Tandem Model 4412 computer having 2 processors, 200 MB of memory, a 1 GB system disk, and a 4 GB RAID disk; a flow diagram illustrating the operation of a preferred software system 700 for implementing billing server 143 on this hardware platform is shown in FIG. 7 and discussed below. Although specific hardware is disclosed herein for implementing enrollment server 145 and billing server 143, it will be understood by those skilled in the art that other suitable hardware platforms may alternatively be used to implement servers 143, 145. However, the two hardware systems described above for implementing servers 143, 145 are preferred because these systems allow servers 143, 145 to be hardware-scalable. This "hardware scalability" allows OLS 140 to handle an increasing number of user stations 102, 102a simply by adding further processors to the existing hardware used for servers 143, 145, without modification of the software running on such hardware. In the embodiment shown in FIG. 1, enrollment server 145 and billing server 143 are implemented in software on separate machines which are physically distinct from the processor(s) used for implementing OLS session server 147. In alternative embodiments (not shown), enrollment server 145 and billing server 143 may be implemented in software together on a single server or as part of OLS session server 147.

Referring now to FIG. 2, there is shown a flow diagram illustrating the operation of a system 200 for enrolling new users associated with user stations 102, 102a onto OLS 140, and capturing co-marketing information associated with such new users, in accordance with a preferred embodiment of the present invention. In step 205, a user station 102 or 102a connects to OLS 140. In the case of a user station 102, the connection to OLS 140 is made by the user station via communications channel 108 directly to FDDI 141; in the case of a user station 102a, the connection is made via OLS site 128 to OLS web server 142. Next, in step 210, the enrollment means 145 determines whether the user which just connected to OLS 140 is a new subscriber to OLS 140. In a preferred embodiment, step 210 is performed either (i) by waiting for the user to issue an enrollment request (from page 514a described below) to OLS 140, or (ii) by prompting the user to enter a login name and comparing the login name entered by the user to a list of valid login names maintained in enrollment database 146. If the user is a new subscriber to OLS 140, processing proceeds to step 220, where the enrollment means 145 determines how the user connected to OLS 140. More particularly, if the user connected to OLS 140 through web server 142, the enrollment means 145 determines that the user is operating on a user station 102a which is connected to OLS 140 via WWW 120; otherwise, enrollment means 145 determines that the user is operating on a user station 102 which is connected to OLS 140 via communications channel 108.

Figure 3:
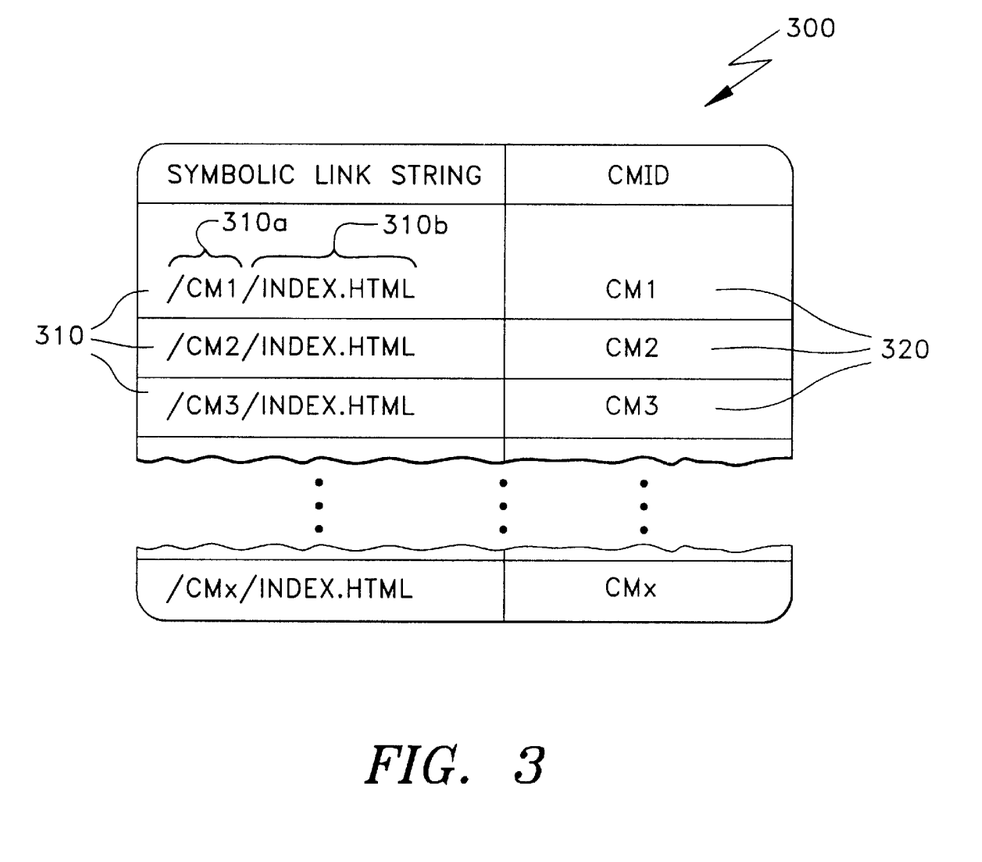
FIG. 3 is a diagram of a look-up table for associating UNIX symbolic link information with co-marketers, in accordance with a preferred embodiment of the present invention.

If a determination is made in step 220 that the user is operating on a user station 102a that connected to OLS 140 through WWW 120, then processing proceeds to step 230 where enrollment means 145 determines a co-marketer identification symbol or code (CM ID) associated with the user station 102a. In this step, the complete destination URL which was passed to OLS web server 142 when the user was directed from a co-marketer site 122a, 122b, 122c to OLS site 128 is retrieved by OLS web server 142, and the second portion of the destination URL, which contains both a UNIX symbolic link and a destination filename (which may be specified implicitly), is then extracted from the complete destination URL. As mentioned above, the UNIX symbolic link embedded in the destination URL uniquely identifies a co-marketer which directed the user from its WWW site to OLS site 128. Next, in step 240, enrollment means 145 attempts to enroll the user in OLS 140. In this step, the enrollment means 145 obtains a co-marketer identification code (CMID) associated with the destination URL using look-up table 300 (shown in FIG. 3). For each valid co-marketer in system 100, table 300 has one or more entries representing the second portion of a potential destination URL that might be generated by such a co-marketer. Thus, each entry in table 300 has a record 310 representing a UNIX symbolic link (310a) and destination filename (310b) that may be provided by a valid co-marketer, and a corresponding record 320 representing a CMID associated with the co-marketer assigned to UNIX symbolic link 310a in system 100. If the second portion of the destination URL is not recognized as corresponding to a valid CMID, the enrollment session is terminated. A list of valid (or authorized) CMID's is preferably stored in a Co-Marketer Information Directory Table on enrollment database 146 shown in FIG. 4. The Co-Marketer Information Directory Table on enrollment database 146 is formed of a plurality of individual records 440, each of which contains a field 442 for storing the CMID of a system authorized co-marketer.

Figure 4:
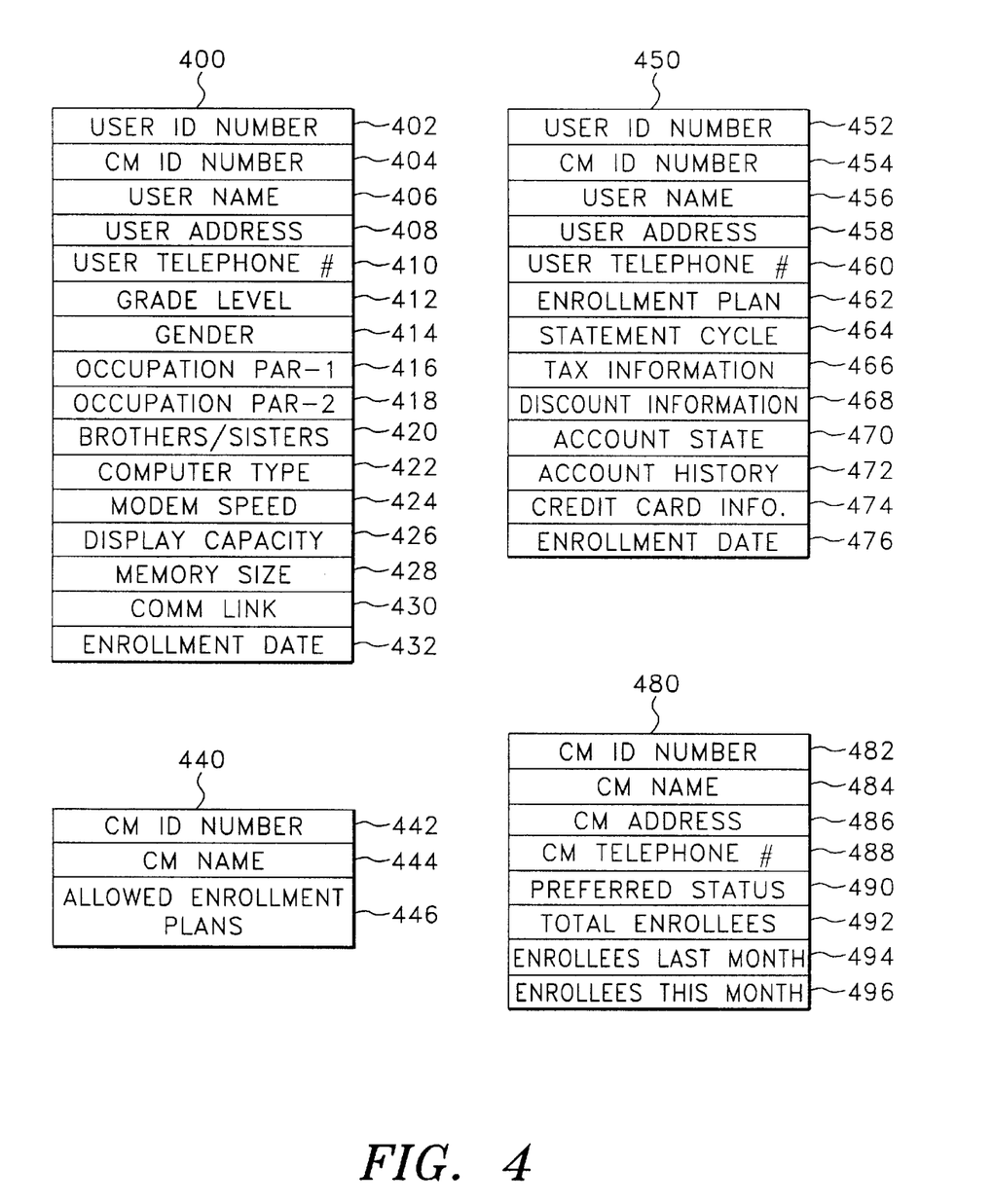
FIG. 4 is a diagram illustrating preferred data structures for storing a Subscriber Information Directory Table, a Customer Information Directory Table, and first and second Co-Marketer Information Directory Tables, in accordance with a preferred embodiment of the present invention.

Referring still to step 240, if the enrollment means 145 determines that the user has been directed to OLS 140 from an authorized co-marketer, the enrollment means attempts to enroll the user in OLS 140 by assigning the user a unique user identification number and then asking the user to enter various personal information which is then stored in a Subscriber Information Directory Table on enrollment database 146. As shown in FIG. 4, the Subscriber Information Directory Table on enrollment database 146 is formed of a plurality of individual records 400, each of which contains several fields for storing information about a particular user. More particularly, for each user enrolled on OLS 140 there is a record 400 with a field 402 for storing the unique user identification number assigned to the user, a field 404 for storing the CM ID of the co-marketer that directed the user to OLS 140, fields 406, 408, 410 for respectively storing the name, address and telephone number of the user, fields 412, 414 for respectively storing the grade level and gender of the user, fields 416, 418 for storing information representing the occupations of the user's parents, field 420 for storing the user's number of siblings, and fields 422, 424, 426, 428 and 430 for respectively storing information representing the type of computer used by the user, the user's modem speed, the display capabilities of the user's display, the size of the memory of the user's PC, and the identity of the communications link (e.g., the Internet, the Prodigy® network, the CompuServe® network, or the Microsoft® network) used for accessing OLS 140.

In addition to storing information about the user in the Subscriber Information Directory Table on enrollment database 146, information about the user being enrolled in step 240 is also stored on a separate Customer Information Directory located on accounting database 144. As shown in FIG. 4, the Customer Information Directory Table on accounting database 144 is formed of a plurality of individual records 450, each of which contains several fields for storing information about a particular user. Fields 452, 454, 456, 458 and 460 store substantially the same information as that which is stored respectively in fields 402, 404, 406, 408 and 410, respectively, described above. However, in step 240 the user is also prompted by the enrollment means 145 to choose an enrollment plan and enter certain personal financial information which is then stored in records 450. In a preferred embodiment, the user may select either a free trial membership or one of several active membership plans, and a code representing the enrollment plan selected by the user is then stored in field 462. If the user has selected either an active or free trial membership plan, the user is prompted to enter credit card information for paying for the selected enrollment plan. This credit card information is stored in field 474 and used by billing means 143 to verify that the user is credit worthy.

Referring again to FIG. 2, following the entry of the user information into records 400, 450, processing proceeds to step 250, where enrollment means 145 downloads a copy of user software 106a onto user station 102a. Unlike the user software 106 described above, user software 106a does not include any embedded CM ID information, or, to state it another way, user software 106a contains a "null" CM ID field embedded therein.

Referring still to FIG. 2, if a determination is made in step 220 that the user is operating on a user station 102 that connected to OLS 140 through channel 108, then processing proceeds to step 260 where enrollment means 145 determines a CM ID associated with the user station 102a. In contrast to step 230, the CM ID is determined in step 260 from an embedded CM ID stored on user software 106 which was previously loaded (in step 202) on user station 102. Next, in step 270, enrollment means 145 attempts to enroll the user in OLS 140. Step 270 is substantially the same as step 240 described above, except in step 270 the CM ID used for creating and updating the records 400 and 450 represents the CM ID embedded in software 106, as opposed to a CM ID determined from a UNIX symbolic link passed to OLS 140 over WWW 120.

Following either step 250 or 270, processing proceeds to step 280, where enrollment means 145 communicates with billing means 143 to determine whether the user is credit worthy. In addition, enrollment means 145 determines (based on the information stored in field 462) whether the user has enrolled as an active (i.e., non-trial) user. If the user is credit worthy and has enrolled as an active user, processing proceeds to step 285, where a payment record for paying a one-time bounty (or referral fee) to the co-marketer that directed the user to OLS 140 is created.

As explained more fully below, the amount of the one-time bounty payment created in step 285 is preferably dependent on the number of users previously directed to OLS 140 by the co-marketer during a previous period (month or quarter). A Co-Marketer Information Directory located on accounting database 144 is provided for storing information about each authorized co-marketer on OLS 140. As shown in FIG. 4, the Co-Marketer Information Directory Table on accounting database 144 is formed of a plurality of records 480, each of which contains several fields for storing information about a particular authorized co-marketer. More particularly, a field 482 is provided for storing the CM ID associated with a co-marketer, and fields 484, 486 and 488 are respectively provided for storing name, address and telephone number information representing the co-marketer. In addition, each time a user is enrolled on OLS 140, the values in fields 492 and 496, which respectively represent the total number of users directed to OLS 140 by the co-marketer and the number of users directed to OLS 140 during the current month are incremented. Each record 480 also contains a field 494 representing the number of users that were directed to OLS by the co-marketer during the previous month. In a preferred embodiment of the present invention, the value stored in field 494 is used in step 285 in calculating the amount of the one time bounty payment to be paid to the co-marketer. More particularly, a higher one-time bounty payment will be paid to a co-marketer in step 285 if the number of prior enrollees represented in field 494 exceeds a predetermined threshold.

When a user reaches OLS site 128 from a previous location on WWW 120, the user will typically be initially directed to the home page at web site 128. In a first embodiment of the present invention described above in connection with FIG. 2, the user may enroll on OLS 140 directly from the home page of site 128 upon reaching site 128. In alternate preferred embodiments described below, the user may browse through the home web page of site 128, and then through various further web pages at site 128, prior to reaching an enrollment page at site 128 (e.g., WWW.OLS.COM\ . . . \ENROLL\ENROLL.P1) from which the user then enrolls onto OLS 140. These alternate preferred embodiments are described respectively in connection with FIGS. 5 and 6. Since the systems described in connection with FIGS. 5 and 6 permit a user to traverse multiple pages at site 128 prior to enrolling on OLS 140, these systems function to preserve the UNIX symbolic link information originally passed to OLS site 128 from a prior web site as the user moves between web pages at site 128.

Figure 5:
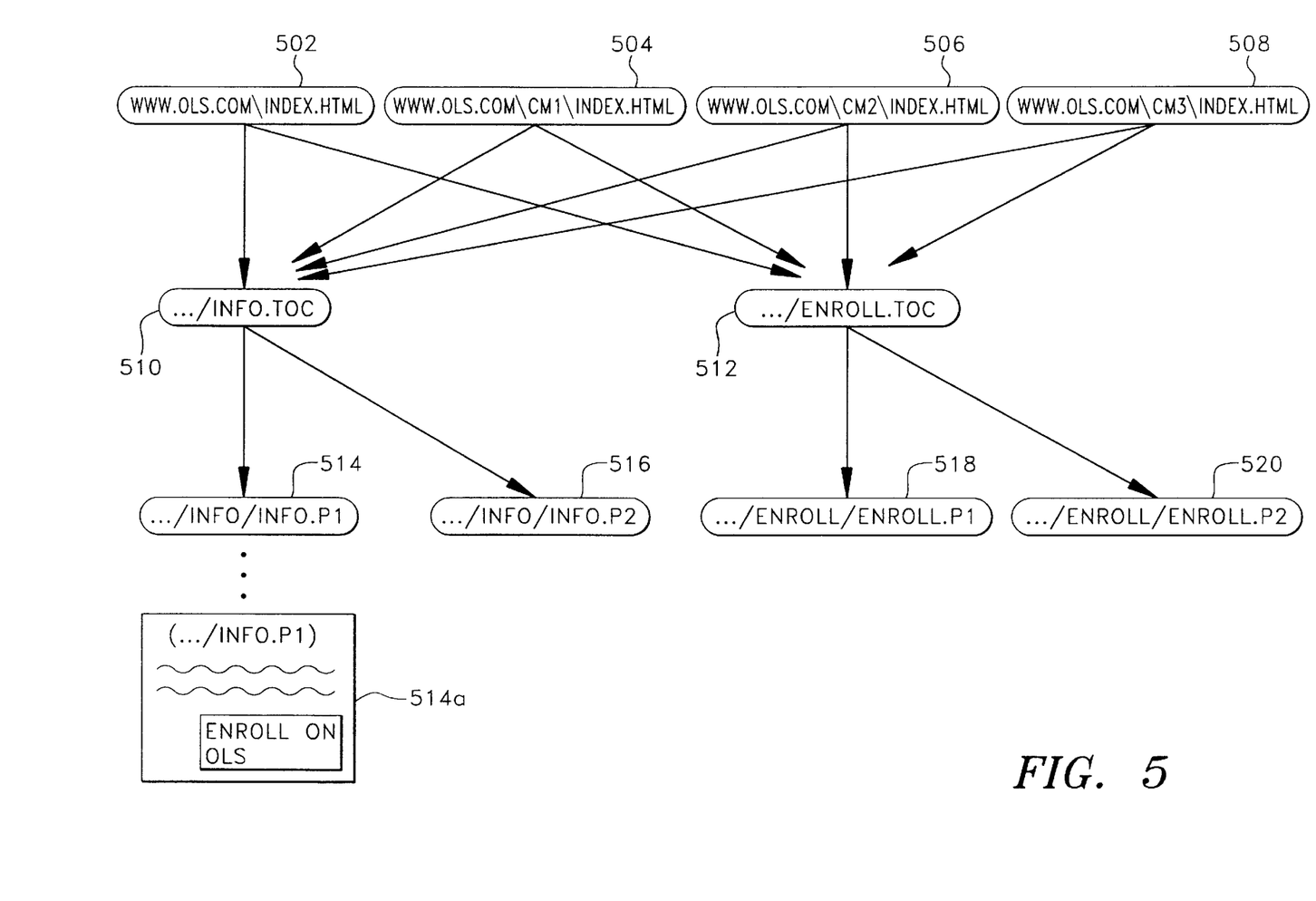
FIG. 5 is a schematic diagram illustrating the use of UNIX symbolic links and relative URL addressing for moving between locations on the WWW, in accordance with a preferred embodiment of the present invention.

Referring now to FIG. 5, there is shown a schematic diagram illustrating the use of UNIX symbolic links and relative URL addressing for moving between page locations at OLS site 128, in accordance with a preferred embodiment of the present invention. URL 502 points to the home page address of OLS site 128 on the WWW. URLs 504, 506, 508 also point to the home page address of OLS site 128 on the WWW; however, URLs 504, 506, 508 each include a UNIX symbolic link (/CM1, /CM2, /CM3) appended thereto. As described above, in the present invention, each UNIX symbolic link appended to a URL represents the identity of a co-marketer that directed a user to the home page address of OLS site 128. When the user arrives at the home page of OLS site 128, the user may then browse through various pages provided by OLS site 128 on the WWW. For example, the user may view pages providing information about OLS 140 by clicking on a "table of contents" entry on the home page of OLS site 128. Upon clicking on this "table of contents" entry on the home page, the user is directed to a Table of Contents Page represented by URL 510. From this Table of Contents Page, the user may click on individual pages (e.g., Info.P1, Info.P2, etc.) listed on the Table of Contents Page. Upon clicking on an individual page such as, for example, Information Page 1, the user is directed to a first information page represented by URL 514.

As described above in the background section, when relative URL addressing is used to move between pages on WWW 120, a user may only move between pages in the user's current directory or to a subdirectory located below the user's current directory in a directory tree such as that shown in FIG. 5. Thus, when standard relative URL addressing is used, it is not possible for a user to move from the page represented by URL 514 to the page represented by URL 518 and still preserve the UNIX symbolic link/CMID information described above. In the example shown in FIG. 5, the page 514a represented by URL 514 contains a box giving the user an option to enroll on OLS 140. In accordance with the present invention, if the user clicks on the "Enroll on OLS" box on page 514a, a special redirecting program (redirect.cgi) is triggered on web server 142 for redirecting the user from the page represented by URL 514 to the OLS enrollment page represented by URL 518. A pseudo-code version of the redirect.cgi program is shown in Table I below:

TABLE I

```
main(input_parameters)
{ //last_url1will hold the URL for the page the user was on
//when they wanted to redirect upward. (for example
//"http://www.ols.com/cm1/subdir1/subdir2/subdir3/info2.html")
last_url = input_parameter[x];
//destination will hold the page they want to redirect to.
//It contains one or more "../" substrings.
//(example. "../../subdirx/enroll.htm")
```

TABLE I-continued

```
destination = input_parameter[y];
//count_substrings() counts the number of substrings ("../")
//within the given string of characters (destination).
//In this example it would return the number "2".
number_of_levels_up = count_substrings("../", destination);
//remove_n_levels() takes a fully specified URL such as
//"http://www.ols.com/cm1/subdir1/subdir2/subdir3/page.htm"
//and removes a given number of directories and the page name.
//For example if number_of_levels_up is 2, the output from
//remove_n_levels(last_url,2) would be
//"http://www.ols.com/cm1/subdir1/"
new_directory = remove_n_levels(last_url, number_of_levels_up);
//get_relative_url() takes the given string and returns the portion
//after all of the "../" substrings. Thus in this example it returns
//"subdirx/enroll.htm"
relative_url = get_relative_url(destination);
//concatenate() takes 2 strings and splices the second one
//onto the back of the first. (in the example this yields:
//"http://www.ols.com/cm1/subdir1/subdirx/enroll.htm")
new_absolute_url = concatenate(new_directory, relative_url);
//redirect_browser() sends a "Hyper-Text Transfer Protocol (http)"
//message back to the user's web browser telling it to get the given URL.
redirect_browser(new_absolute_url);
}
```

Thus, the redirect.cgi program accepts as arguments the current URL of the user (e.g., URL 514) and a destination URL representing the location to which the user desires to move (e.g., URL 518). The program then strips the " . . . /Info/Info.P1" portion off of the current URL 514, and replaces the striped portion with the " . . . /Enroll/Enroll.P1" portion of destination URL 518 to form a new URL which is then used for redirecting the user to the page represented by URL 518. The redirect.cgi program is significant to the operation of the present invention because, among other things, this program allows the UNIX symbolic link information that was originally passed when the user arrived at the home page of OLS site 128 to be retained as the user moves between pages at OLS site 128. Thus, the redirecting.cgi program insures that the UNIX symbolic link information provided by a co-marketer will be present when the enrollment means 145 attempts to enroll the user on OLS 140.

The redirect.cgi program discussed in connection with FIG. 5 and Table I above represents a first preferred system for retaining at site 128 the UNIX symbolic link information (that was originally passed when the user originally arrived at OLS site 128 from a previous site) as the user moves between web pages at OLS site 128. In accordance with an alternative preferred embodiment of the present invention, a further system (described in connection with FIG. 6 and Table II below) may alternatively be used to store and transmit the UNIX symbolic link information that was originally passed when the user arrived at the home page of OLS site 128. In this alternate embodiment, the URL used to direct a user from a previous site (e.g., 122a, 122b, 122c) to OLS site 128 includes a string which functions to call a special page_link.cgi program which runs on web server 142. The string passed to OLS site 128 also contains (i) a destination page identifier (or filename) representing the particular web page at site 128 to which the user has been directed by the previous web site, and (ii) a UNIX symbolic link or CMID code associated with the previous web site. More particularly, the destination page identifier and the UNIX symbol link information/CMID code are included in the string as arguments to the page_link.cgi program An exemplary URL which invokes the page_link.cgi program and that could be used by co-marketer site 122a for directing a web user from a site 122a to the home page of site 128 is shown below:

WWW.OLS.COM\page_link.cgi?index@CM1

Figure 6:
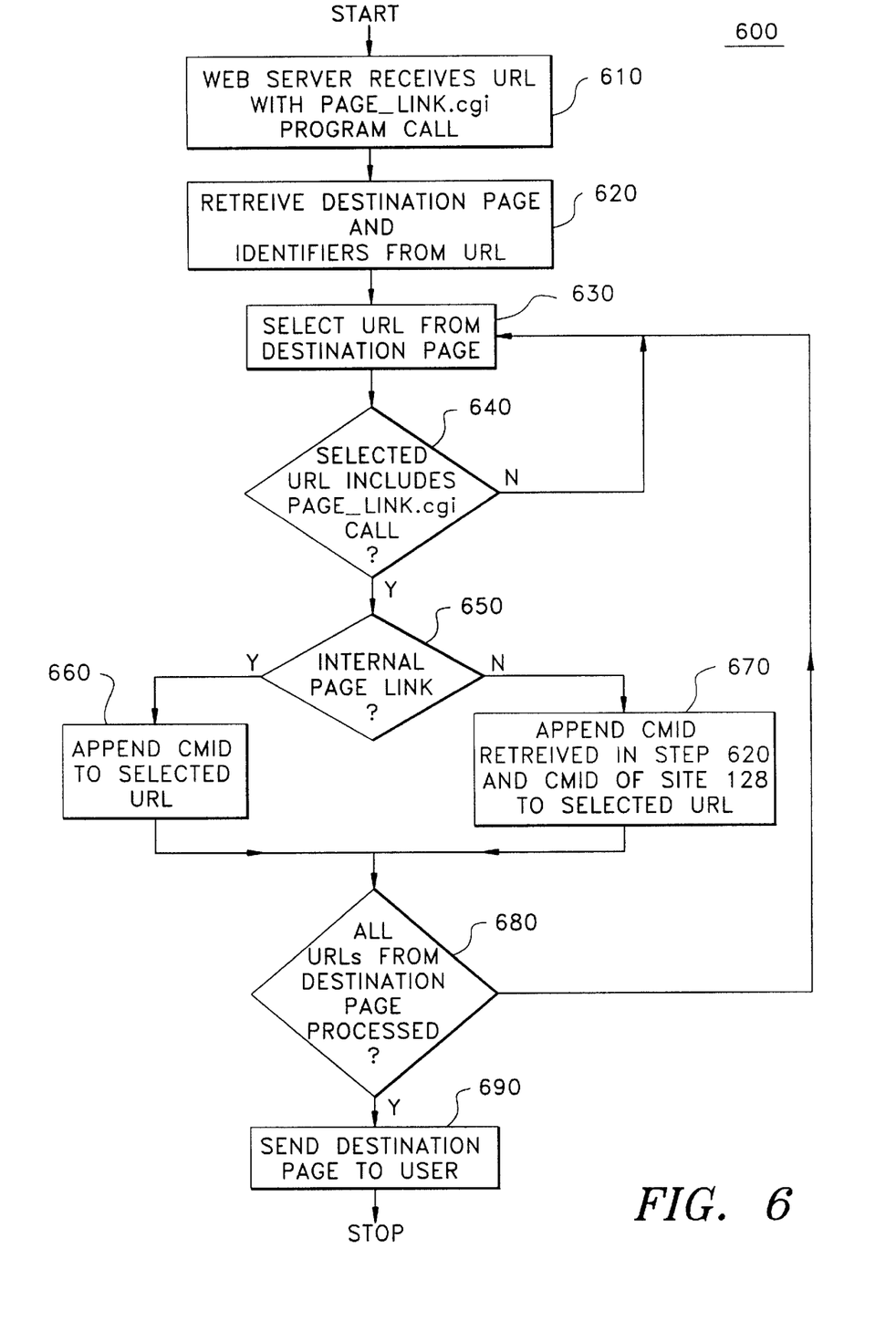
FIG. 6 is a flow diagram illustrating the operation of a system for attaching a code representing the navigational history of a user on the WWW onto selected URL page links on a destination web page of a user, in accordance with an alternative preferred embodiment of the present invention.

The first portion (i.e., WWW.OLS.COM) of this exemplary URL identifies web site 128 as the web site to which the user is being directed. The remaining portion (i.e., page_link.cgi?index@CM1) of the URL represents a call to the page_link.cgi program. The program call includes two arguments, namely, a destination page identifier (i.e., index) representing the particular page at site 128 to which the user has been directed, and a UNIX symbolic link/CMID code (i.e., CM1) representing the identity of the web site 122a that directed the user to site 128.

Referring now to FIG. 6, there is shown a flow diagram of a system 600 for implementing the page_link.cgi program In step 610, when web server 142 receives a URL which includes a string containing a call to the page_link.cgi program, the page_link.cgi program is invoked on the web server 142. Next, in step 620, the page_link.cgi program extracts the destination page identifier (e.g., index) and UNIX symbolic link/CMID code (e.g., CM1) that were contained as arguments in the page_link.cgi program call. Next, the page at web site 128 represented by the destination page identifier is retrieved. Each page at web site 128 is represented by a file which includes one or more fields containing further URLs representing links to other pages at web site 128 (internal page links) or to pages at web sites other than site 128 (external page links). Each URL in the destination page is then selected and tested (in steps 630 and 640) in order to determine whether the URL includes a string for calling the page_link.cgi program. If the URL does include the "page_link.cgi" string, a further determination is made (in step 650) whether the URL represents an internal or external page link. In this step, the URL will be determined as representing an internal page link if the first portion of the URL represents OLS site 128 (i.e., "WWW.OLS.COM") or if there is no site name portion in the URL; otherwise the URL will be determined as representing an external page link. Next, in step 660, for each internal URL in the destination page which includes a string for calling the page_link.cgi program, the page_link.cgi program appends the UNIX symbolic link/CMID code (i.e., CM1) originally passed as an argument to the program to the end of the URL. In addition, in step 670, for each external URL in the destination page which includes the "page_link.cgi" string, the page_link.cgi program appends the UNIX symbolic link/CMID originally passed to the program followed by a UNIX symbolic link/CMID representing OLS site 128 (e.g., /OLS) to the end of the URL. The process is then repeated from step 630 for each URL on the destination page. The destination page, which includes URLs having the appended codes described above is then passed back to the user in step 690. Thereafter, when the user desires to move off of the destination page (passed to the user in step 690), the user will select one of the URL page links on the user's page as a new destination page. If the URL corresponding to this new destination page contains a call to the page_link.cgi program described above, the process described above is repeated from step 610 using the URL of the new destination. A pseudo-code listing of an exemplary web page file and of the page_link.cgi program are shown below in Table II:

TABLE II

```
WEB PAGE FILE PSEUDO CODE
<HTML>
<HEAD>
<TITLE>Online Service Home Page</TITLE>
</HEAD>
<BODY>
<A HREF="http://www.ols.com/cgi-bin/page_link.cgi?enroll&CM1">
Enroll page on OLS
140</A>
<A HREF="http://www.other.com/">Visit another
company's web pages</A>
<A HREF="http://www.cm.com/cgi-bin/page_link.cgi?
index&CM1&OLS">Maintain comarketer info and visit another site</A>
</BODY>
</HTML>
PAGE LINK CGI PSUEDO CODE
PageLink (URL) {
  get destinationPageName and CMID_string from URL
  //assuming the following URL:
  //"http://www.ols.com/cgi-bin/page_link.cgi?index&CM1"
  //destinationPageName is index, as it follows "page_link.cgi?"
  //and the CMID_string is "CM1", as it follows the
  //destinationPageName (and is separated by a "&").
  //
  //CMID_string consists of one or more comarketer codes
  //separated by "&" characters, and records the path taken
  //by the user through web sites which employ this tracking
  //system
  put contents of page named destinationPageName into destinationPage
  for each URL in destinationPage
  {
    if URL contains page_link.cgi call and refers to an internal URL
    {
      //if there is no site name or if the site name matches
      //this on-line service's, the URL is internal
      append CMID_string to URL
    }
    else if URL contains page_link.cgi call and is an external URL
    {
      //if there is a site name and it does not match that of OLS 140,
      //the URL is external
      append CMID_string to URL
      append OLS_string to URL
      //OLS_string refers to the CMID code of
      //the site running this instance of the page_link.cgi
      //application, and is unique among all sites participating.
    }
    //note that nothing is done to URLs which do not refer to
    //the page_link.cgi application, since no comarketer code
    //tracking is done when users follow these links
  }
  send page
}
```

In the embodiment shown in FIG. 6 and described above, each page link URL on a web page at site 128 will preferably include a call to the page_link.cgi program if the page link points to either (i) a further web page at site 128, or (ii) a further web site which is adapted to recognize UNIX symbolic links that have been inserted into a URL by a previous web site during a user session. By inserting the page_link.cgi program call and UNIX symbolic link information into each page link that points to a further web page at site 128, the system insures that the UNIX symbolic link information originally passed to site 128 by a previous web site will be available when OLS 140 attempts to enroll the user into OLS 140. In addition, by inserting the UNIX symbolic link information associated with both a previous web site 122a, b, c and OLS site 140 into page links associated with different web sites (other than site 128), the system permits the user to carry UNIX symbolic link information representing previous location(s) traversed during a user session to further web sites.

Referring now to FIG. 7, there is shown a flow diagram illustrating the operation of a system 700 for generating recurring bounty payment records, in accordance with a preferred embodiment of the present invention. In addition to providing each co-marketer with a one-time bounty payment each time a user directed to OLS 140 by the co-marketer enrolls on OLS 140, billing means 143 also generates "recurring" bounty payment records for certain selected co-marketers that have secured a preferred status with OLS 140. Information representing whether or not a particular co-marketer has such preferred status (and is thus eligible to receive a recurring bounty payment) is stored in field 490 of records 480. As shown in system 700, a recurring bounty payment is determined for each preferred co-marketer on a periodic basis based on the number of users that were referred to OLS 140 by the co-marketer (at any time) and which are still active subscribers on OLS 140.

Referring still to FIG. 7, in step 710 a counter used for determining the total number of active users associated with each co-marketer is initialized, preferably to zero. Next, in step 720 a co-marketer record 480 having a preferred status (as indicated by field 490) is selected for processing. Next, a user record 450 having the same CM ID (as indicated by field 454) as that of the selected co-marketer is selected for processing. If field 470 of the selected user record indicates that the selected user is still an active user and the user has been an active user on OLS 140 for at least 90 days (as indicated by field 476), then processing proceeds to step 750 where the recurring user counter is incremented. Next, in step 760, the process is repeated from step 730 until each user record 450 having the same CM ID as the selected co-marketer has been processed. Thereafter, in step 770, the billing means 143 generates a recurring bounty payment for the selected co-marketer by multiplying a value represented by the recurring user counter with a per user bounty amount. Finally, in step 780, the process is repeated from step 710 until each co-marketer having a preferred status has been processed.

In an alternate preferred embodiment of the present invention (not shown), the value stored in field 492 may be used by system 700 (at step 770) in calculating the rate of each recurring bounty payment to be paid to each preferred co-marketer. More particularly, a higher recurring bounty payment rate may be paid to a co-marketer if the value of enrollees represented in field 492 exceeds a predetermined threshold.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A method for redirecting a user operating on a user station from a first location on a world wide web (WWW) to a second location on said WWW, wherein relative universal resource locator (URL) addressing is used during said redirecting process, comprising the steps of:

(A) receiving a signal from said first location indicating that said user wishes to move from said first location on said WWW to said second location on said WWW;

(B) passing, in response to said signal, a current URL representing an address of said first location on said WWW and a destination URL portion representative of an address of said second location on said WWW to a redirecting means, said current URL having first and second portions;

(C) forming a destination URL, with said redirecting means, by substituting said destination URL portion in place of said second portion in said current URL, wherein said destination URL represents a relative address of said second location on said WWW; and (D) moving said user from said first location on said WWW to said second location on said WWW in accordance with said destination URL formed in step (C);

wherein said destination URL includes a symbol representing a prior WWW site traversed by said user before said user reached said second location, said second location being on a subsequent WWW site, said subsequent WWW site being different from said prior WWW site, said prior WWW site being different from said user station, said subsequent WWW site being different from said user station.

2. The method of claim 1, wherein said destination URL portion recited in step (B) is formed from a directory identifier associated with said second location.

3. The method of claim 2, wherein said first portion of said current URL recited in step (B) is formed from a web page address identifier associated with said first and second locations.

4. The method of claim 3, wherein said first portion of said current URL recited in step (B) is further formed of a UNIX symbolic link representing a prior WWW location traversed by said user before said user reached said first location on said WWW.

5. The method of claim 4, wherein said prior WWW location represents a co-marketer of on-line services on said WWW and said web page identifier is associated with an on-line service on said WWW.

6. The method of claim 5, further comprising the step of:

(E) using, at said second location, said UNIX symbolic link to pay a bounty to said co-marketer.

7. An apparatus for redirecting a user operating on a user station from a first location on a world wide web (WWW) to a second location on said WWW, wherein relative universal resource locator (URL) addressing is used during said redirecting, comprising:

(A) means for receiving a signal from said first location indicating that said user wishes to move from said first location on said WWW to said second location on said WWW;

(B) means for passing, in response to said signal, a current URL representing an address of said first location on said WWW and a destination URL portion representative of an address of said second location on said WWW to a redirecting means, said current URL having first and second portions;

(C) said redirecting means including means for forming a destination URL by substituting said destination URL portion in place of said second portion in said current URL, wherein said destination URL represents a relative address of said second location on said WWW; and (D) means for moving said user from said first location on said WWW to said second location on said WWW in accordance with said destination URL formed by said redirecting means;

wherein said destination URL includes a symbol representing a prior WWW site traversed by said user before said user reached said second location, said second location being on a subsequent WWW site, said subsequent WWW site being different from said prior WWW site, said prior WWW site being different from said user station, said subsequent WWW site being different from said user station.

8. The apparatus of claim 7, wherein said destination URL portion is formed from a directory identifier associated with said second location.

9. The apparatus of claim 8, wherein said first portion of said current URL is formed from a web page address identifier associated with said first and second locations.

10. The apparatus of claim 9, wherein said first portion of said current URL is further formed of a UNIX symbolic link representing a prior WWW location traversed by said user before said user reached said first location on said WWW.

11. The apparatus of claim 10, wherein said prior WWW location represents a co-marketer of on-line services on said WWW and said web page identifier is associated with an on-line service on said WWW.

12. The apparatus of claim 11, further comprising:

(E) bounty payment means, responsive to said UNIX symbolic link, for paying a bounty to said co-marketer.

* * * * *